July 11, 1944.     S. W. SEELEY     2,353,204
WAVE LENGTH MODULATION
Filed Oct. 15, 1942
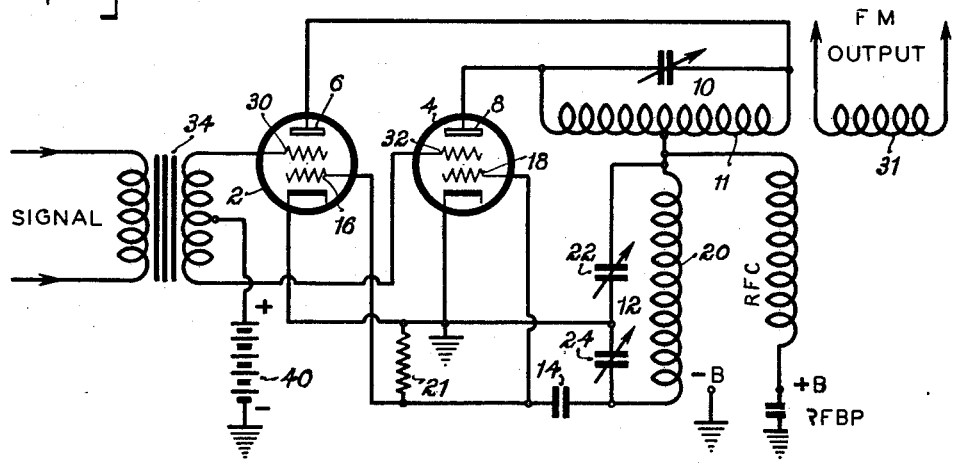
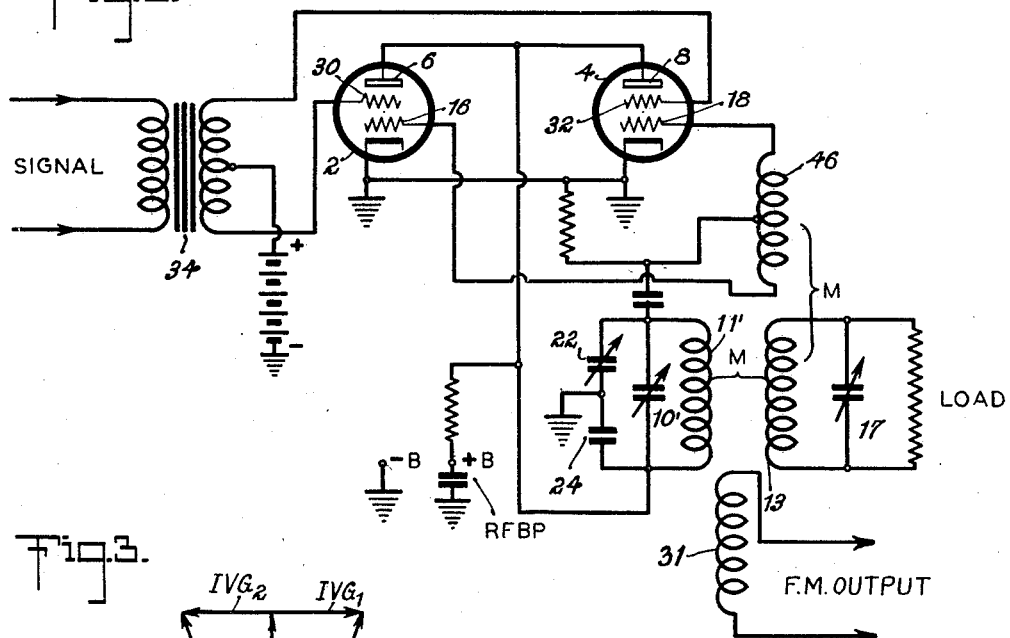
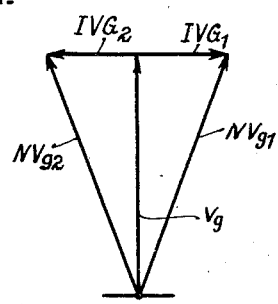
INVENTOR
STUART W. SEELEY
BY *H. S. Grover*
ATTORNEY Patented July 11, 1944

2,353,204

UNITED STATES PATENT OFFICE 2,353,204

WAVE LENGTH MODULATION

Stuart W. Seeley, Roslyn, N. Y., assignor to Radio Corporation of America, a corporation of Delaware Application October 15, 1942, Serial No. 462,069

17 Claims. (Cl. 179—171.5)

This application concerns a new and improved wave length or timing modulation system. By the term "wave length modulation" applicant means control of the instantaneous frequency of wave energy in accordance with signals or control potentials. This control or modulation may be as to phase or frequency or modified forms of either or both.

An object of my invention is to provide tube means for generating oscillatory energy of substantially constant mean frequency and means including the generating tubes for modulating the length of the oscillations in accordance with signal potentials.

In describing my invention in detail, reference will be made to the attached drawing, wherein Figures 1 and 2 each illustrates a form of my new and improved wave length modulation system and each system includes tubes and simplified circuits for generating and wave length modulating wave energy. Figure 3 is a vector diagram used to illustrate the operation of my systems.

In Figure 1, tubes 2 and 4 have their anodes 6 and 8 coupled by tuned tank circuit 10. A point on the tank circuit 10 is connected by a radio-frequency choking inductance RFC to any direct current supply source which may be bypassed by a radio-frequency bypassing condenser. The tank circuit 10 is of high radio-frequency potential throughout its length due to the choking action of the inductance RFC. A point, such as, for example, the same point on the inductance 11 of the tank 10 is connected to one terminal of a parallel tuned circuit 12, the other terminal of which is connected by a coupling condenser 14 to the grids 16 and 18 of the tubes. A point between the condensers 22 and 24 of this last tuned circuit is connected to the cathodes of the tubes 2 and 4. A resistor 21 is connected between the grids 16 and 18 and the cathodes to supply the grid bias potential. The cathodes are also grounded as is the negative terminal of the direct current source connected to the inductance RFC.

The screening grids 30 and 32 are connected in push-pull relation by the secondary winding of a modulation transformer 34, the primary winding of which is coupled to any control or modulation potential source. A positive potential for the screening electrodes 30 and 32 is supplied by a source 40 connected to a point on the secondary transformer 34. This source 40 may be the same as the source connected to the inductance RFC.

First consider the system as an oscillation generator. the circuit 12 is tuned to the frequency of the oscillations it is desired to generate as the carrier frequency. Disregarding the effect of the coupling of circuit 10 to circuit 12, the circuit 12 in effect couples the grid and anode circuits of the tubes 2 and 4 in parallel. Condenser 24 in one embodiment thereof was made larger than condenser 22. Since the parallel circuit is between the grids and anodes, the voltages on these electrodes are of opposed phase and oscillations are generated of a frequency determined primarily by the tuning of circuit 12. The voltage on the grids 16 and 18 might be represented by the vector Vg in Figure 3.

However, circuit 10 is coupled to the circuit 12 either by internal capacities in tubes 2 and 4 alone, or by the same and mutual inductance between the windings 11 and 20. Circuits 10 and 12 are tuned, and, as a consequence, the voltages induced in circuit 12 from circuit 10 are displaced in phase by 90° with respect to the voltages in 10. These voltages induced in 12 are opposed and their effects cancel so that if tubes 2 and 4 amplify like amounts, these voltages and their effects may be disregarded. The induced voltages, if any, in winding 20 in the presence of equal gain in the tubes may be represented by the vectors IVg1 and IVg2 in Figure 3.

Thus, in carrier condition we may say that the radio-frequency current flowing through the two halves of winding 11 in parallel and thence through circuit 12 to the grids of tubes 2 and 4 are of like phase on the grids. Moreover, the grid voltages are substantially opposed in phase with respect to the anode voltages, so that the tubes tend to operate as parallel oscillation generators.

Now when modulation is applied and the gain of one tube goes up, the first voltage on the grids 16 and 18 mentioned above does not change materially in phase. However, the opposed voltages induced in winding 20 are no longer equal and there is a resultant voltage on the grids which is in quadrature with respect to the said first voltages, and the tubes act as reactances of a given sign depending on whether the second resultant voltage lags or leads the first voltage by 90°. That is, if say the gain of tube 4 is modulated up, while the gain of tube 2 is modulated down, the second resulting voltage may lead the first voltage by about 90°, whereas if tube 2 is modulated up and tube 4 down in gain, the said second resultant voltage will lag the first voltage about 90°.

The net excitation voltage on the grids, as a consequence, shifts in phase about its phase opposition position with respect to the anode voltage. The resultant grid voltage may be considered to shift during modulation from the position of vector NVg1, Figure 3, to the position of vector NVg2 and back.

As long as the voltages on the grid electrodes 16 and 18 remain of fixed phase, the frequency of the oscillator does not change because any oscillator may be considered as an amplifier wherein unit gain is maintained and wherein zero phase shift takes place between the input and output voltages. However, in such an oscillator if a little phase shift between the input and output voltages is set up, the oscillator frequency will inherently change to establish the condition described above, e. g., unity gain and zero phase shift in the oscillator.

In my system, I differentially modulate the currents through the tubes 2 and 4 by differentially modulating or controlling the potentials on the grids 30 and 32.

Under the circumstances, therefore, during modulation the current through one tube is increased and the current through the other tube is decreased. The coupling between the tank circuit 10 and the grids 16 and 18 by way of the tube capacities or by way of the mutual coupling between 11 and 20 is unbalanced somewhat in say one direction, depending on which tube draws the most current and which tube draws the least current to thereby introduce a shift in the voltage reaching the grids 16 and 18. The condition for oscillation described above has now been changed and the system inherently undergoes a change in frequency of operation to again establish zero phase shift between the oscillations in the system. When the modulation changes to increase current through the tube heretofore drawing the least current and decrease current through the tube heretofore drawing the most current, the circuit 10 as coupled to 12 is unbalanced in a different direction, thereby introducing a slight shift in the phase of the voltage fed to the grids 16 and 18, and this shift is in an opposite direction so that the oscillator frequency again changes and in a different sense. In this manner the generated oscillations are modulated in frequency.

In the arrangement of Figure 2, the anodes 6 and 8 of tubes 2 and 4 are connected to a tuned tank circuit 10', a point on which between condensers 22 and 24 is returned by way of ground to the cathodes to include some of tank circuit 10' in the anode circuit and more thereof in this case (condenser 22 is larger than 24) in the grid circuit. The inductance 11' is coupled to the inductance 13 of the load circuit 17. The load coupling circuit and tank 10' are tuned to the same frequency, i. e., the carrier frequency, so that the voltage induced in 13 from 11' is in phase quadrature with respect to the inducing voltages in inductance 11'.

The grid circuit comprises an untuned winding 46, the mid-point of which is connected to the grid end of the tank circuit 10' and the ends of which are connected to the grids 16 and 18. The winding 46 is closely coupled to the winding 13 so that the voltage induced from 13 into 46 is in phase with the voltage in 13. Since the voltage in 13 is in phase quadrature with respect to the voltage in 11', the voltage in 46 is also in phase quadrature with respect to the voltage in 11'.

When considered in the absence of modulation, that is, when both tubes are amplifying like amounts we have voltages of like phase represented by vector Vg on the grids 16 and 18 due to the fact that the tuned circuit 10' is coupled at opposed ends to the grids and anodes in parallel. These voltages represented by Vg are opposed in phase with respect to the anode voltages.

Due to the couplings between 11' and 13 and 46, we also have on the grids 16 and 18 opposed voltages IVg1 and IVg2. The control grids, therefore, are excited by resultant voltages NVg1 and NVg2 which are of substantially the same amplitude and also substantially in phase opposition to the anode voltages on the respective tubes. As long as the tubes amplify alike, the effect is as if voltages of a net phase which may be represented by Vg are fed to the grids and oscillations of a substantially fixed frequency, which is the carrier frequency and the frequency to which 10' and 17 are tuned are generated in the tubes and circuits.

Now assume modulation is applied differentially to the parallel coupled oscillator tubes, and further that the gain of one tube, say 2, goes up because its grid becomes more positive and the gain of tube 4 goes down because its grid is biased less positively. The amount of radio-frequency current fed to the tank circuit 10' by the tube 2 goes up, while the radio-frequency power fed to the tank circuit by tube 4 goes down. The net plate radio-frequency current shifts in phase and in a direction toward the phase of the radio-frequency supplied by tube 2. This causes a shift in the net voltages NVg1 and NVg2 in the same direction. The oscillators inherently shift in frequency to re-establish zero phase shift.

Decreasing the gain of tube 2 and increasing the gain of tube 4 shifts the phase of net anode current in tank circuit 10' in the opposite direction thereby causing a shift in the voltages NVg1 and NVg2 on the grids in the opposite direction so that the generator shifts in frequency and takes up a new frequency at which zero phase shift is re-established. By the application of signals or control potentials at transformer 34, the generated oscillations are correspondingly controlled in frequency.

The output may be taken from a circuit 31 coupled to the inductance 11 in Figure 1 and from an output including inductance 31 coupled to the inductance 11' in Figure 2.

What is claimed is:

1. In a system of the class described, a pair of electron discharge devices each having input and output electrodes, a parallel tuned regenerative circuit coupling the input electrodes to the output electrodes in such a manner that voltages of substantially opposed phase are set up on the input and output electrodes, a differential coupling between said input and output electrodes for producing similar differential voltages which are substantially in phase quadrature with respect to said first mentioned voltages and substantially cancel in the presence of equal amplifications in said devices, and means for differentially modulating the amplification of said devices in accordance with signals to upset said balance and apply resulting phase quadrature voltages to said input electrodes.

2. In a system of the class described, a pair of electron discharge devices each having input and output electrodes, a regenerative circuit including a parallel tuned circuit coupling the input electrodes to the output electrodes in such a manner that in-phase voltages of substantially opposed phase are set up on the input and output electrodes, a differential coupling between said input and output electrodes for producing similar differential voltages which are in phase quadrature with respect to said in-phase voltages and substantially cancel and neutralize each other in the presence of equal amplifications in said devices, and connections for differentially modulating the amplification of said devices in accordance with signals so that said phase quadrature voltages no longer neutralize each other and a resultant phase quadrature voltage is impressed on said input electrodes.

3. In a system of the class described, a pair of electron discharge devices each having input and output electrodes, a regenerative circuit including a parallel tuned circuit coupling the input electrodes to the output electrodes in such a manner that voltages of substantially opposed phase are set up on the input and output electrodes, a circuit coupling corresponding electrodes of said tubes differentially, a coupling between said last-named circuit and said first-named circuit for producing similar differential voltages which are in phase quadrature with respect to said first voltages and substantially neutralize each other in the presence of equal amplification in said devices, means for differentially modulating the amplification of said devices in accordance with signals so that said phase quadrature voltages no longer neutralize each other and a resultant phase quadrature voltage is produced, and means for impressing said resultant voltage on said input electrodes.

4. In a timing modulation system, a pair of electron discharge devices each having an electron emission electrode, an electron flow control electrode and an electron receiving electrode, connections including frequency controlling reactances connecting the electrodes of said devices for the production of sustained oscillations of carrier wave frequency, said connections including, a first coupling for applying phase reversed voltages from the electron receiving electrodes to the electron flow control electrodes, a second coupling for impressing opposed voltages from the electron receiving electrodes to the electron flow control electrodes said last named voltages being substantially in phase quadrature with respect to the first mentioned voltages on the electron receiving electrodes, and connections for differentially controlling the gain of said devices to change the phase relations of the applied voltages and thereby correspondingly vary the timing of the oscillations generated.

5. In a wave length modulation system. an oscillation generator including a pair of electron discharge tubes having their anodes and control grids coupled in parallel by a tuned circuit a point on which is coupled to the cathodes of said tubes whereby oscillations are generated in said tubes and circuits, means including a second circuit coupled differentially to said grids and coupled to said first-named tuned circuit for applying to said grids voltages substantially in phase quadrature with respect to the voltages set up thereon by said tuned circuit, which voltages are of opposed polarity and substantially equal so that they substantially compensate in the absence of modulation, and connections for modulating the gain of said tubes differentially in accordance with control potentials to thereby correspondingly differentially modulate the amplitude of the second mentioned opposed voltages so that they no longer compensate and a resultant voltage of reversible polarity is applied to said grids during modulation.

6. In apparatus of the class described, a pair of electron discharge tubes having their anodes connected together and to one terminal of a tuned tank circuit including inductance, a coupling between the other terminal of said tuned tank circuit and the grids of said tubes, a coupling between a point on said tuned tank circuit and the cathodes of said tubes, whereby oscillations are generated in said tubes and voltages of a first phase are set up on said grids, a second tuned tank circuit including inductance coupled between said anodes, there being inductive coupling between said inductances, and connections for modulating the impedances of said tubes in push-pull relation in accordance with signals.

7. In apparatus of the class described, a pair of electron discharge tubes having their anodes connected together and to one terminal of a tuned tank circuit, a coupling between a point on said tuned tank circuit and the cathodes of said tubes, a coupling between the other terminal of said tuned tank circuit and the control grids of said tubes, an untuned inductance included in said last coupling, said untuned inductance connecting the control grids of said tubes in differential relation, a coupling between said tuned circuit and said untuned inductance for impressing on the latter differential voltages substantially in phase quadrature with respect to the first voltages on said grids and connections for modulating the impedances of said tubes in opposition in accordance with signals.

8. In a wave length modulation system, an oscillation generator including a pair of electron discharge tubes having their anodes and control grids coupled in parallel by a tuned circuit, a coupling between a point on said tuned circuit and the cathodes of said tubes whereby oscillations are generated in said tubes and circuits when the electrodes of said tubes are energized, a second tuned circuit coupled between said anodes and coupled to said first-named tuned circuit for applying to said grids another voltage substantially in quadrature with respect to the voltages set up on said grids by said first tuned circuits, and connections for modulating the gain of said tubes differentially in accordance with control potentials to thereby reverse the phase and vary the amplitude of said second voltage.

9. In a wave length modulation system, an oscillation generator including a pair of electron discharge tubes having their anodes and control grids coupled in parallel by a tuned circuit including inductance, a coupling between a point on said tuned circuit and the cathodes of said tubes whereby oscillations are generated in said tubes and circuits, a second circuit including inductance coupled differentially between said grids, a coupling between the inductance of said second circuit and the inductance of said first-named tuned circuit for applying to said grids other voltages substantially in quadrature with respect to the voltages set up on said grids by said first tuned circuits, and connections for modulating the gain of said tubes differentially in accordance with control potentials to thereby shift the phase of the resultant voltages on said control grids by relatively varying the amplitude of said second voltages.

10. In a wave length modulation system, a pair of electron discharge tubes each having input and output electrodes, including a cathode, two circuits comprising inductance and capacity tuned to the same desired operating frequency, said inductances being inductively coupled to transfer energy from one tuned circuit to the other, connections effectively coupling one of said tuned circuits between the input electrodes of said tubes, connections effectively coupling the other of said tuned circuits between the input and output electrodes of said tubes, a coupling between a point on said other of said tuned circuits and the cathodes of said tubes, and connections for modulating the impedances of said tubes in phase opposition in accordance with signals.

11. In a timing modulation system, a pair of electron discharge devices each having an electron emission electrode, an electron flow control electrode and an electron receiving electrode, two circuits each comprising inductance and capacity parallel tuned substantially to the same carrier wave frequency, connections including one of said tuned circuits in series between the electron receiving electrodes and electron flow control electrodes of said devices, a connection between a point on said one tuned circuit and the electron emission electrodes of said devices, whereby the voltages on the electron receiving electrodes and electron flow control electrodes are of substantially opposed phase and oscillations of the frequency to which said circuits are tuned are generated in said devices and circuits, the two inductances of said tuned circuits being inductively coupled, connections coupling the other of said tuned circuits between the electron receiving electrodes of said devices, a coupling between a point on said other of said tuned circuits and the electron emission electrodes of said devices, said last named coupling including said one of said tuned circuits, and connections for differentially controlling the gain of said devices in accordance with signals.

12. In a timing modulation system, a pair of electron discharge devices each having an electron emission electrode, an electron flow control electrode and an electron receiving electrode, two circuits each comprising inductance and capacity parallel tuned substantially to the same carrier wave frequency, connections including one of said tuned circuits in series between the electron receiving electrodes and electron flow control electrodes of said devices, a connection between a point on said one tuned circuit and the electron emission electrodes of said devices, whereby the voltages on the electron receiving electrodes and electron flow control electrodes are of substantially opposed phase and oscillations of the frequency to which said circuits are tuned are generated in said devices and circuits, the two inductances of said tuned circuits being inductively coupled, a third inductance coupled to the inductance of the other of said tuned circuits, connections coupling the electron flow control electrodes of said devices in pushpull relation through said third inductance, whereby phase opposed voltages are impressed on said electron flow control electrodes which voltages are substantially in phase quadrature with respect to the first mentioned voltages on said electron flow control electrode, and connections for differentially controlling the gain of said devices to change the phases of the voltages on said electron control electrodes and correspondingly vary the timing of the oscillations generated.

13. In a wave length modulation system, a pair of electron discharge devices each having input and output electrodes, two circuits tuned to the same desired operating frequency, an inductance in each of said circuits, said inductances being inductively coupled together to transfer energy from one tuned circuit to the other, connections effectively coupling one of said tuned circuits to the input electrodes of said devices, connections coupling the other of said tuned circuits to the output electrodes of said devices, means for causing wave energy of said desired operating frequency to flow in said circuits, and connections for modulating the impedances of said devices in phase opposition in accordance with signals.

14. In a wave length modulation system, a pair of electron discharge devices each having an electron emission electrode, an electron flow control electrode and an electron receiving electrode, circuits including frequency controlling reactances interconnecting the electrodes of said devices for the production of oscillations, said circuits including, a first coupling for applying phase reversed in-phase voltages from the electron receiving electrodes to the electron flow control electrodes, a second coupling for impressing opposed voltages from the electron receiving electrodes to the electron flow control electrodes, said last named voltages being substantially in phase quadrature with respect to the voltages on the electron receiving electrodes, and means for differentially controlling the gain of said devices to thereby correspondingly vary the length of the oscillations generated.

15. In a wave length modulation system, an electron discharge device having an electron emission electrode, an electron flow control electrode and an electron receiving electrode, a circuit tuned to the desired operating frequency coupling said flow control electrode to said emission electrode, a circuit tuned to the same frequency coupling the electron receiving electrode to said emission electrode, a first coupling between said circuits for applying a phase reversed voltage from the electron receiving electrode to the electron flow control electrode, a second coupling between said circuits for impressing on the electron flow control electrode a voltage substantially in phase quadrature with respect to the voltage on the electron receiving electrode, and means for controlling the gain of said device in accordance with signals.

16. In a wave length modulation system, a pair of electron discharge devices each having an electron emission electrode, an electron flow control electrode and an electron receiving electrode, an oscillation generating circuit coupling said electrodes in a manner to produce sustained oscillations, said circuit and couplings including a first coupling for applying a phase reversed in-phase voltage from the electron receiving electrodes to the electron flow control electrodes, a second coupling for impressing opposed voltages from the electron receiving electrodes to the electron flow control electrodes, said last named voltages being substantially in phase quadrature with respect to the voltages on the electron receiving electrodes, and means for differentially controlling the gain of said devices.

17. In a timing modulation system, a pair of electron discharge devices each having an electron emission electrode, an electron flow control electrode and an electron receiving electrode, connections including frequency controlling reactances connecting the electrodes of said devices for the production of sustained oscillations of carrier wave frequency, said connections including, a first coupling for applying phase reversed in-phase voltages from the electron receiving electrodes to the electron flow control electrodes, a second coupling for impressing opposed voltages from the electron receiving electrodes to the electron flow control electrodes, said last named voltages being substantially in phase quadrature with respect to the voltages on the electron receiving electrodes, and connections for differentially controlling the gain of said devices to change the phase relations of the applied voltages and thereby correspondingly vary the timing of the oscillations generated.

STUART W. SEELEY.